United States Patent Office 3,140,229
Patented July 7, 1964

3,140,229
LAXATIVE COMPOSITIONS CONTAINING (4,4'-DI-HYDROXY-2''-AMINO) - TRIPHENYLMETHANE AND METHOD OF USING SAME
Otto-Erich Schultz and Jorg Schneckenburger, Kiel, and Ernst Seeger, Biberach an der Riss, Germany, assignors to Boehringer Ingelheim, G.m.b.H., Ingelheim am Rhein, Germany, a corporation of Germany
No Drawing. Filed Dec. 28, 1960, Ser. No. 78,812
6 Claims. (Cl. 167—56)

This invention relates to laxative compositions and to a method of stimulating bowel movements.

A great number of laxative compositions comprising variety of active ingredients have appeared on the market. These active ingredients generally fall into two classes with respect to the mode of action by which they stimulate the expulsion of feces from the intestinal tract. First, there are those laxitive agents which add water to the intestinal contents (and consequently increase their bulk) so as to soften them; a well-known representative member of this type of laxitive agent is dioctyl sodium sulfosuccinate. Secondly, there is that group of cathartics which depend for their action upon an irritant principle, such as castor oil and (4,4'-diacetoxy-diphenyl)-(2-pyridyl)-methane. While the majority of these known cathartics are very effective, they have the disadvantage that they release a number of side effects which, depending upon the nature of the patient, are in one way or another undesirable. For example, the action of dioctyl sodium sulfosuccinate is often rather uncertain and does not set in until after 24 to 48 hours. On the other hand, while the action of (4,4'-diacetoxy-diphenyl)-(2-pyridyl)-methane is absolutely certain, it must be orally administered in the form of pills provided with a shell made of material which is insoluble in the stomach but soluble in the intestine, because without such a coating the compound tends to irritate the stomach lining and may also produce tenesmus.

It is an object of the present invention to provide a method of stimulating bowel movements which combines assurance of prompt effective laxative action with substantial freedom from undesirable side effects, especially tenesmic side effects.

It is another object of the present invention to provide a method of stimulating bowel movements which does not require the application of an enteric coating to the unit dosage form for oral administration of the cathartic.

Other objects and advantages of the present invention will become apparent as the description thereof proceeds.

We have discovered that the above objects and advantages are achieved by orally or rectally administering the compound 4,4'-dihydroxy 1-2''-amino-triphenylmethane of the formula

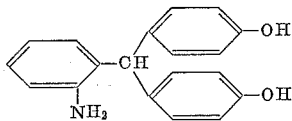

or its acid addition salts with non-toxic, pharmacologically acceptable acids, such as hydrochloric acid, sulfuric acid, tartaric acid, citric acid, maleic acid, lactic acid and the like, to a patient requiring stimulation of the bowel movements. The laxatve action takes effect after only 6 to 12 hours and is so mild that the expulsion of the intestinal contents takes place completely painlessly. 4,4'-dihydroxy-2''-amino triphenyl-methane and its non-toxic acid addition salts do not have any irritating effect upon the mucous lining of the stomach, so that the use of shells or envelopes made of material which is insoluble in the stomach but soluble in the intestinal tract can be eliminated; thus, they may be administered orally in the form of any customary dosage unit composition adapted for oral administration. Consequently, the method according to the present invention not only provides for elimination of undesirable side effects but also for a considerable simplification of the manufacture of pharmaceutical dosage unit compositions suitable for practicing the method of the invention.

In order to produce stimulation of the bowel movements in accordance with the present invention, (4,4'-dihydroxy - 2'' - amino) - triphenylmethane or its non-toxic acid addition salts are administered orally or rectally, advantageously in the form of dosage unit compositions comprising 0.5 to 50% by weight of the active laxative ingredient together with a pharmaceutically inert carrier, such as lactose, glucose, saccharose, corn starch, potato starch, magnesium stearate, gelatin, cocoa powder, cocoa butter, a synthetic suppository base mass, carboxymethyl cellulose and the like. As already mentioned, these compositions may take any customary liquid or solid form, such as tablets, sugar-coated pills, chocolate wafers, pastes with fruit flavorings, suspensions, emulsions and rectal suppositories.

One dosage unit for adults should contain from 25 to 200 mgm. and preferably from 50 to 100 mgm. of the (4,4'-dihydroxy-2''-amino)-triphenylmethane active ingredient, calculated as the free base. Thus, if a non-toxic acid addition salt is used as the active ingredient its dosage weight in the composition should be somewhat larger. The average daily dose for adults is 50 to 400 mgm., preferably 50 to 150 mgm.

Pure (4,4'-dihydroxy 2''-amino)-triphenylmethane is a white crystalline substance having a melting point of 215–217° C. It was first prepared by Tanasescu and Simonescu by condensation of o-nitrobenzaldehyde with phenol to form (4,4'-dihydroxy-2''-nitro)-triphenylmethane and subseqeunt reduction of the latter to convert the 2''-amino group into an amino group [J. prakt. Chemie, New Series, vol. 141, page 321 (1934)], yielding a raw product having a melting point of 195° C. The non-toxic, pharmacologically acceptable acid addition salts of (4,4'-dihydroxy-2''-amino)-triphenylmethane may be obtained by customary methods, that is, by reacting the free base with the corresponding acid. The raw salt may, if necessary, be purified by recrystallization from a suitable solvent. Thus, the hydrochloride of (4,4'-dihydroxy-2''-amino)-triphenylmethane has a melting point of 236–239° C. and the sulfate has a melting point of 196–198° C.

The toxicity of (4,4'-dihydroxy-2''-amino)-triphenylmethane is extraordinarily low; the peroral $LD_{50}$ in rats is more than 5000 mgm./kg. The compound is also satisfactorily tolerated upon regular peroral administration over long periods of time; thus, peroral administration of a daily dose of 50 mgm./kg. to rats over a period of 150 days did not produce any extraordinary symptoms, and no unusual histological changes were observed upon examination of the sacrificed test animals.

In 60 tests on adult rats weighing from 150–200 gm. the average effective laxative dose per kg. body weight was determined to be 25 mgm./kg. Thus, the effective dose of (4,4'-dihydroxy-2''-amino)-triphenylmethane is distinctly lower than that of phenolphthalein (160 mgm./kg.) and 1,8-dihydroxyanthraquinone (300 mgm./kg.).

The cathartic action of (4,4'-dihydroxy-2''-amino)-triphenylmethane preferentially takes effect in the large intestine. Using the test method of Magnus [Pflügers Archiv, vol. 102, page 124 (1904)], it was determined that the addition of 2–4γ of (4,4'-dihydroxy-2''-amino)-triphenylmethane per 10 cc. of bath liquid produced a clearly visible peristaltic activity in isolated large intestines of rats and guinea pigs. Furthermore, in vivo tests on intestines of cats, using the test procedure of Straub and Viaud, Arch. Exp. Path. and Pharm. 169, 1 (1933), showed that 20–50γ of (4,4′-dihydroxy-2″-amino)-triphenylmethane produced an unequivocal effect which was evidenced by a multiplication of the registered peristalsis of the large intestine.

No toxic symptoms were observed after peroral administration of up to 5 gm./kg. of (4,4′-dihydroxy-2″-amino)-triphenylmethane to rats. Thus, the assured tolerated dose is 5000 mgm./kg. Consequently, based on an average effective dose of 25 mgm./kg., the therapeutic ratio of the compound is 1:200. In comparison thereto, the therapeutic ratio of phenolphthalein is 1:43 and that of 1,8-dihydroxy-anthraquinone 1:23, i.e., much less.

The following examples illustrate typical dosage unit compositions comprising (4,4′-dihydroxy-2″-amino)-triphenylmethane or its non-toxic acid addition salts as active cathartic ingredients which may be used in practicing the method according to the present invention. The parts are parts by weight.

Example I

*Tablets.*—The tablets are compounded from the following ingredients:

| | Parts |
|---|---|
| (4,4′-dihydroxy-2″-amino)-triphenylmethane | 50.0 |
| Lactose | 100.0 |
| Corn starch | 54.0 |
| Potato starch, dried | 10.0 |
| White gelatin | 4.0 |
| Magnesium stearate | 2.0 |
| | 220.0 |

*Compounding procedure.*—The (4,4′-dihydroxy-2″-amino)-triphenylmethane, the lactose and half of the corn starch are admixed with each other and the resulting mixture is kneaded with a 10% solution of the white gelatin in water. The resulting moist mass is then forced through a 1 mm.-mesh screen and is dried. The dry granulate thus obtained is admixed with the remaining half of the corn starch, the other components are added and the mixture is thoroughly homogenized. Tablets, each weighing 220 mgm., are then prepared from this homogeneous mixture in a conventional tablet making machine under medium pressure.

Example II

*Coated pills.*—The pill cores are compounded from the following ingredients:

| | Parts |
|---|---|
| (4,4′-dihydroxy-2″-amino)-triphenylmethane | 75.0 |
| Lactose | 100.0 |
| Corn starch | 54.0 |
| Potato starch, dried | 10.0 |
| White gelatin | 4.0 |
| Magnesium stearate | 2.0 |
| | 245.0 |

*Compounding procedure.*—The (4,4′-dihydroxy-2″-amino)-triphenylmethane, the lactose and half of the corn starch are admixed with each other and the resulting mixture is kneaded with a 10% solution of the white gelatin in water. The resulting moist mass is forced through a 1 mm.-mesh screen and is then dried. The dry granulate thus obtained is admixed with the remaining half of the corn starch and with the other components and the resulting mixture is thoroughly homogenized. Pill cores, each weighing 245 mgm., are then prepared from this homogeneous mixture in a conventional pill making machine. The pill cores are then coated in conventional fashion with a thin shell consisting essentially of sugar and talcum. The coated pills are finally polished with beeswax in a rotating drum polisher.

Example III

*Chocolate wafers.*—The wafers are compounded from the following ingredients:

| | Parts |
|---|---|
| (4,4′-dihydroxy-2″-amino)-triphenylmethane | 100.0 |
| Cocoa powder | 115.0 |
| Cane sugar | 115.0 |
| Glucose | 100.0 |
| Potato starch, dried | 30.0 |
| Solid fat (adeps solidus) | 20.0 |
| Talcum | 20.0 |
| | 500.0 |

*Compounding procedure.*—The (4,4′-dihydroxy-2″-amino)-triphenylmethane, the cocoa powder, ⅔ of the cane sugar, the glucose and the potato starch are admixed with each other. The resulting mixture is then kneaded with a 65% sugar syrup prepared from the remaining third of the cane sugar and distilled water. Thereafter, the kneaded mixture is further kneaded with a 30% solution of the solid fat in isopropylalcohol heated to 50° C. The resulting moist mass if forced through a 1 mm.-mesh screen and is dried at 40° C. The dry granulate thus obtained is thoroughly admixed with talcum and this mixture is pressed into wafers, each weighing 500 mgm., in a conventional wafer making machine at medium pressure.

Example IV

*Suspension.*—The suspension is compounded from the following ingredients:

| | Parts |
|---|---|
| (4,4′-dihydroxy-2″-amino)-triphenylmethane | 2.0 |
| Carboxymethyl cellulose (high viscosity) | 0.5 |
| Silicic acid (Aerosil) | 1.5 |
| Citric acid | 0.1 |
| Sodium phosphate | 0.3 |
| p-Hydroxy-benzoic acid methyl ester | 0.07 |
| p-Hydroxy-benzoic acid propyl ester | 0.03 |
| Essence of cocoa | 1.5 |
| Sugar | 22.0 |
| Glycerin | 10.0 |
| Distilled water | 72.0 |
| | 110.0 |

*Compound procedure.*—The p-hydroxy-benzoic acid esters are dissolved in the indicated amount of water at 80° C. The resulting solution is cooled to 30° C. and the citric acid and sodium phosphate are dissolved therein. The glycerin is added and then, while constantly stirring, a mixture composed of the indicated amounts of sugar and carboxymethyl cellulose is incorporated. Thereafter, the silicic acid, the (4,4′-dihydroxy-2″-amino)-triphenylmethane in finely milled form and the essence of cocoa are added and the resulting mixture is stirred until a homogeneous suspension is obtained.

The finished suspension is filled into suitable containers, such as bottles, from which the prescribed dosage may be withdrawn. 5 cc. of the suspension contain 100 mgm. of (4,4′-dihydroxy-2″-amino)-triphenylmethane.

Example V

*Suppositories.*—The suppositories are compound from the following ingredients:

| | Parts |
|---|---|
| (4,4′-dihydroxy-2″-amino)-triphenylmethane | 150.0 |
| Cocoa butter | 1600.0 |
| | 1750.0 |

*Compounding procedure.*—The cocoa butter is melted and then brought to a temperature of 36° C. The (4,4′-dihydroxy-2″-amino)-triphenylmethane, in finely powdered form, is added and stirred in until substantially uniformly distributed throughout the cocoa butter. The mixture is then cooled to 35° C. and poured into precooled suppository molds of such size that each suppository weighs 1.75 gm.; each suppository then contains 150 mgm. of the active ingredient.

Example VI

*Coated pills.*—The pill core was compounded from the following ingredients:

| | Parts |
|---|---|
| (4,4'-dihydroxy-2''-amino)-triphenylmethane hydrochloride | 40.0 |
| Corn starch | 67.0 |
| Potato starch | 10.0 |
| White gelatin | 2.0 |
| Magnesium stearate | 1.0 |
| | 120.0 |

The compounding procedure is analogous to that described in Example II, except that the final homogeneous mixture is pressed into pills weighing 120 mgm. each. After applying the coating and polishing, each coated pill weighs 180 mgm.

Example VII

*Gelatin capsules.*—The contents of the capsules are compounded from the following ingredients:

| | Parts |
|---|---|
| (4,4'-dihydroxy-2-''-amino)-triphenylmethane sulfate | 50.0 |
| Lactose | 70.0 |
| Talcum | 10.0 |
| | 130.0 |

*Compound procedure.*—The individual ingredients are screened through a relatively fine-mesh screen and then blended in a mixer until a substantially uniform mixture is obtained. The mixture is then filled into gelatin capsules of a siutable size to hold 130 mgm. of the mixture.

(4,4'-dihydroxy-2''-amino)-triphenylmethane and its acid addition salts with non-toxic acids may also be administered orally or rectally in dosage unit compositions additionally comprising other cathartics, such as phenolphthalein. The following examples will illustrate this variation.

Example VIII

*Tablets.*—The tablets are compounded from the following ingredients:

| | Parts |
|---|---|
| Phenolphthalein | 100.0 |
| (4,4'-dihydroxy-2''-amino)-triphenylmethane | 25.0 |
| Tartaric acid | 2.0 |
| Lactose | 47.0 |
| Corn starch | 40.0 |
| Magnesium stearate | 2.0 |
| White gelatin | 4.0 |
| | 220.0 |

*Compounding procedure.*—The phenolphthalein, the (4,4'-dihydroxy-2''-amino)-triphenylmethane, the lactose and half of the corn starch are admixed with each other. The resulting mixture is kneaded with a 10% solution of the white gelatin in water which also contains the indicated amount of tartaric acid. The moist mass is forced through a 1 mm.-mesh screen and is then dried at 40° C. The dry granulate thus obtained is admixed with the remaining ingredients and the mixture is homogenized. The homogeneous composition is then pressed into tablets weighing 220 mgm. each.

Example IX

*Coated pills.*—The pill core is compounded from the following ingredients:

| | Parts |
|---|---|
| 3,3-bis-(p-acetoxyphenyl)-oxindole | 5.0 |
| (4,4'-dihydroxy-2''-amino)-triphenylmethane | 40.0 |
| Potato starch | 72.0 |
| White gelatin | 2.0 |
| Magnesium stearate | 1.0 |
| | 120.0 |

*Compounding procedure.*—The 3,3-bis-(p-acetoxyphenyl)-oxindole, the (4,4'-dihydroxy-2''-amino)triphenylmethane and ¾ of the potato starch are admixed with each other and the resulting mixture is kneaded with a 10% solution of white gelatin in water. The moist mass is forced through a 1 mm.-mesh screen and is then dried at 40° C. The dry granulate thus obtained is uniformly admixed with the remaining potato starch and the magnesium stearate and the resulting mixture is pressed into pills weighing 120 mgm. each. The pills are then coated and polished as described in Example II. Each coated pill weighs 180 mgm.

While we have illustrated our invention with the aid of the certain specific embodiments, it will be apparent to those skilled in the art that the invention is not limited to these illustrative embodiments and that various changes and modifications may be made therein without departing from the spirit of the invention or the scope of the appended claims.

We claim:

1. The method of stimulating bowel movements which comprises introducing into the digestive tract from 25 to 200 mgm. of a compound selected from the group consisting of (4,4'-dihydroxy - 2''-amino) - triphenylmethane and its nontoxic, pharmacologically acceptable acid addition salts in dosage unit form.

2. The method of stimulating bowel movements which comprises introducing into the digestive tract single doses of from 25 to 200 mgm. of a compound selected from the group consisting of (4,4'-dihydroxy - 2''-amino) - triphenylmethane and its nontoxic, pharmacologically acceptable acid addition salts in dosage unit form, the daily dosage being no greater than 400 mgm.

3. A laxative composition in dosage unit form consisting essentially of 25 to 200 mgm. of a compound selected from the group consisting of (4,4'-dihydroxy-2''-amino)-triphenylmethane and its non-toxic, pharmacologically acceptable acid addition salts and a physiologically compatible carrier selected from the group consisting of solid carriers and water containing a dispersing agent.

4. A laxative composition as in claim 3, comprising in addition at least one other laxative agent selected from the group consisting of phenolphthalein, 3,3-bis-(p-acetoxyphenyl)-oxindole and 1,8-dihydroxy-anthraquinone.

5. A laxative composition in tablet dosage unit form consisting of 25 to 150 mgm. of a compound selected from the group consisting of (4,4'-dihydroxy-2''-amino)-triphenylmethane and its non-toxic, pharmacologically acceptable acid addition salts and a solid physiologically compatible carrier.

6. A laxative composition in suppository form free from undesirable side effects, consisting essentially of 50 to 150 mgm. of a compound selected from the group consisting of (4,4'-dihydroxy-2''-amino) - triphenylmethane and its non-toxic, pharmacologically acceptable acid addition salts and a suppository base mass.

References Cited in the file of this patent

Chemical Abst., vol. 33, 1939, page 2517[9].
Schultz: Chem. Abst., vol. 50, 1956, page 4142a.
Schultz: Archiv der Pharmazie, vol. 292, December 1959, pages 690–693.